UNITED STATES PATENT OFFICE.

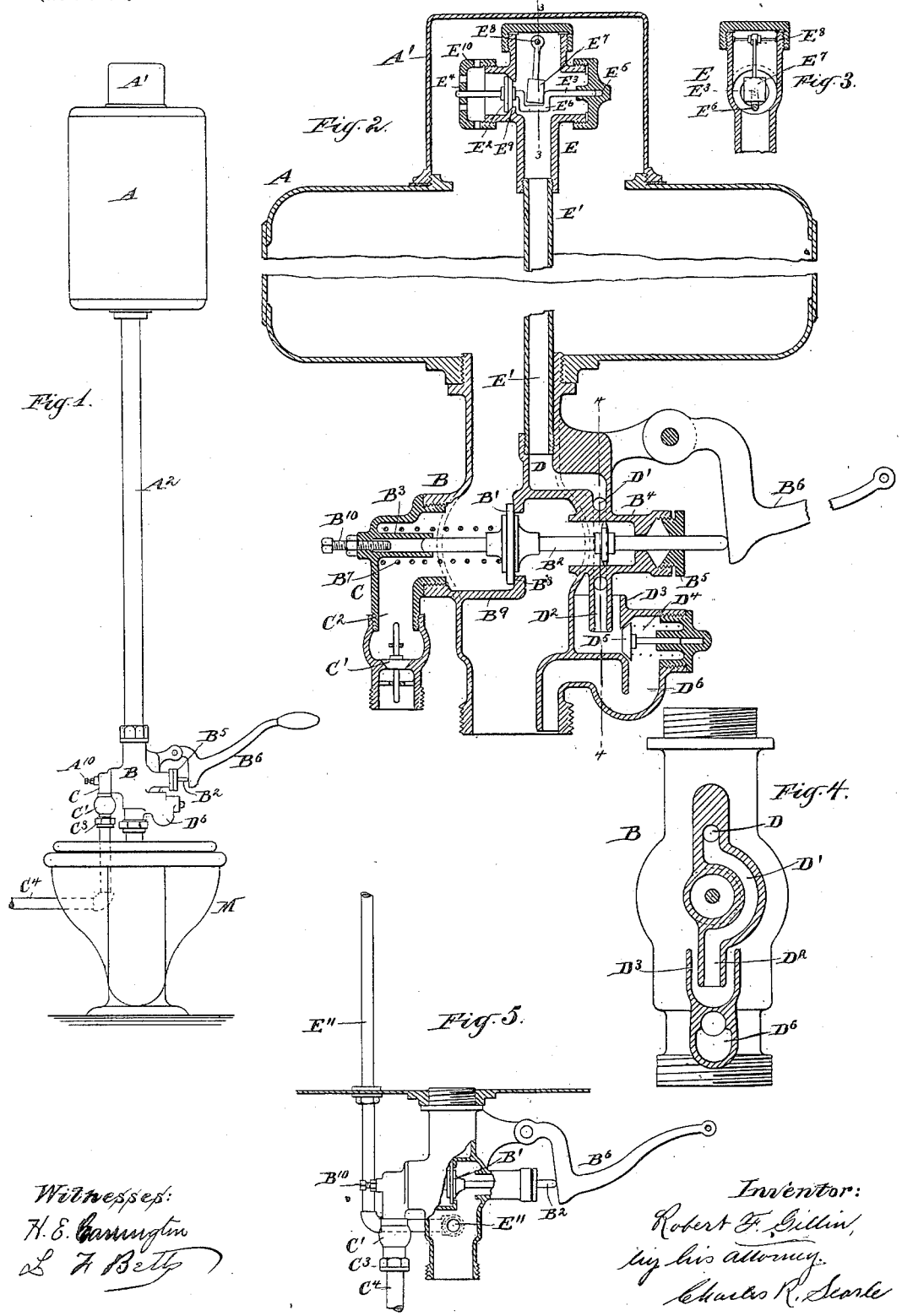

ROBERT F. GILLIN, OF NEW YORK, N. Y.

FLUSHING SYSTEM.

SPECIFICATION forming part of Letters Patent No. 649,928, dated May 22, 1900.

Application filed June 5, 1899. Serial No. 719,372. (No model.)

*To all whom it may concern:*

Be it known that I, ROBERT F. GILLIN, a citizen of the United States, residing in the city of New York, borough of Brooklyn, in the county of Kings and State of New York, have invented a certain new and useful Improvement in Flushing Systems, of which the following is a specification.

The invention relates more particularly to flushing-tanks and their connections as applied to water-closets, and will be so described.

The object is to provide means whereby a less volume of water will be required and the downward rush accelerated by air-pressure and to produce a flushing system that may be easily and quickly installed without especially-skilled labor or exceptional conditions.

It consists of a closed tank having a discharge-pipe extending downward to the closet and equipped with a self-closing valve, which when forced inward will allow the water to escape to the bowl and perform its cleansing functions, as usual. A small chamber forming part of the closed tank is mounted on top of the latter and incloses an extremely-sensitive air-inlet valve held normally closed, and when open allowing communication from the external air to the interior of the chamber to insure rapid emptying under all conditions. The air-passage leads to a point below the self-closing valve, so that any leakage of water past the air-valve will be led to the closet. The supply-pipe is introduced at the casing of the self-closing valve, so that but one opening is necessary in the tank for both supply and delivery. The closed tank will ordinarily contain a volume of air imprisoned above the water and at a pressure the same as that of the water-service, and on opening the discharge-valve the water will rush downward with great force, due to the air-pressure, and effectually flush the closet; but when left idle for long periods the imprisoned air will escape through unavoidable leaks and absorption by the water until the tank is completely full and the air-valve drowned. It is the function of the air-valve when the apparatus is thus conditioned to allow air to enter when the discharge-valve is opened. By inclosing it in the small chamber above the body of the tank the escape of but a small quantity of water through the large discharge-pipe will free the air-valve and allow it to quickly open and supply the required air. Thus the tank will empty immediately by gravity, but without the rush attained when the apparatus is working normally, as it will if used with sufficient frequency.

The invention also consists in certain details of construction and arrangements of parts to be hereinafter described.

The accompanying drawings form a part of this specification and show the invention as I have carried it out.

Figure 1 is a front elevation of the apparatus, on a small scale, complete and equipped to be operated by a hand-lever conveniently placed near the closet. Fig. 2 is on a much larger scale and shows a vertical section through the tank and air-valve and the discharge-valve and its immediately-adjacent parts equipped to be operated by a chain and pull. Fig. 3 is a vertical section through the air-valve on the line 3 3 in Fig. 2 and taken at a right angle to the latter figure. Fig. 4 is a section on the line 4 4 in Fig. 2. Fig. 5 is a partial section and elevation showing a modified form of the discharge-valve.

Similar letters of reference indicate like parts in all the figures.

A is an elevated tank or reservoir located above the closet M and connected, as usual, to the latter by the large discharge-pipe $A^2$, through which the contents of the tank are delivered when required. The tank is closed and all joints sealed to make it as nearly air and water tight as possible and is provided with a small dome or chamber A', screwed or otherwise tightly secured to the upper face, and thus forming an extension of the tank.

B is the discharge-valve casing, which may be located immediately below the tank, as shown in Fig. 2, and its valve operated by a chain and pull, or at any convenient point in the discharge-pipe nearer the closet, as shown in Fig. 1, to be operated by a hand-lever. The general construction is the same in each, and consists of a disk valve B', mounted on a horizontally-moving stem $B^2$, guided in the tube $B^3$ at one end and at the other in an extension $B^4$, equipped with a suitable stuffing-box $B^5$, through which its end protrudes to be acted upon by the lever $B^6$ in opposition to a strong helical spring $B^7$, encircling the opposite end and tending to force the valve to its seat $B^8$ on the diaphragm $B^9$, forming a vertical partition in the valve-casing. When the lever $B^6$ is released, the spring $B^7$ seats the valve, aided by the pressure of water above, and shuts off the flow to the closet. A set-screw $B^{10}$, tapped into the outer end of the tube $B^3$ in line with the stem, limits the throw of the valve and determines the amount of opening. The tube $B^3$ is part of an independent casting C, screwed into and forming, in effect, a portion of the casing B. It is provided with a check-valve $C'$ in the vertical passage $C^2$ and is screw-threaded below to receive a coupling $C^3$ from the water-supply pipe $C^4$. Water entering through the pipe lifts the check-valve and passes into the casing B on the upper or supply side of the diaphragm and valve $B'$, and thence upward to the tank above, either directly or through the delivery-pipe, compressing the air in the tank until the pressure equals its own. If when thus conditioned the lever $B^6$ be moved to open the valve $B'$, the water in the tank rushes downward to the closet by gravity, increased in velocity by the expansion of the confined air, and performs the flushing operation, as will be understood.

To insure rapid emptying when the tank and chamber are completely filled, as they may be under certain conditions, means are provided for admitting air above.

D is an air-passage formed by coring or otherwise in the casing B and leading outwardly above the diaphragm $B^9$, through the semicircular portion $D'$ around the valve-stem, to the open air at $D^2$, below within an open recess or cup $D^3$, from which extends a lateral passage $D^4$, closed by a delicately-hung check-valve $D^5$, leading to a trap $D^6$, and thence again downward inside the casing B to discharge into the delivery-pipe. The upper end of the passage D is tapped to receive a pipe $E'$, leading upward within the valve-casing and tank, thus avoiding the necessity for an independent opening, to the casing E of an air-valve located as high as may be within the chamber $A'$, surmounting the tank. The valve proper consists of a conical disk $E^2$, carried on a horizontally-moving stem $E^3$, having guides $E^4$ and $E^5$ and provided with an offset or return-bend $E^6$, partially inclosing a weight $E^7$, swinging from a point $E^8$ above within the casing and tending by its gravity to lightly force the disk to its seat $E^9$. The guide $E^4$ is in a perforated or open-work cap $E^{10}$ on the delivery side of the valve and allows the air to flow freely to the interior of the chamber and tank when the valve is open.

When, through long standing unused or by leakage past the valve $E^2$ the tank and chamber are completely filled with water and the valve is drowned, the delivery-valve is opened, the water in the tank and valve-casing B on the supply side will tend momentarily to hang back, because of the air-pressure below; but on account of the large passages in the pipe $A^2$, and valve-opening, a portion of the water immediately passes the valve, and, as the chamber $A'$ is relatively small, frees the upper portion around the air-valve and the latter immediately opens to supply the partial vacuum through the air-passages, above described, leading from the cup $D^3$, and the contents of the tank flow freely downward through the pipe $A^2$, as before, but under the force of gravity alone, without the rush due to the air-pressure. On closing the valve $B'$ the apparatus is conditioned to act as first described.

Any leakage past the valve $E^2$ trickles down the pipe $E'$ to the air-passage D and thence to the cup $D^3$, where it accumulates until its pressure is sufficient to open the delicate check-valve $D^5$ and it flows to the trap $D^6$ and finally passes harmlessly to the closet.

The function of the check-valve $D^5$ is to prevent any escape backward due to the violent rush when the compressed air asserts itself and sometimes forces a portion of the water through the trap $D^6$ and thence out into the room. This backing up may be avoided by adjusting the screw $B^{10}$ to limit the size of the valve-opening and choke the flow past the valve, and is preferably so regulated when the pressure from the street-main is approximately constant. The trap $D^6$ is intended to seal the pipe $A^2$ and prevent any escape of odors therein to the air in the room.

The check-valve $C'$ in the supply-passage $C^2$ serves to prevent the escape of the contents of the tank by any diminution in pressure in the service-pipe due to the opening of faucets on lower floors and similar temporary disturbances.

The several parts constituting the discharge and air valves are so constructed as to be easily and accurately assembled and with as few joints as practicable. The apparatus is self-contained and may be installed without great labor or careful adjustment, so that great skill and experience are not essential in placing it in position and successful operation.

It will be observed that water from the service-pipe $C^4$ may flow past the valve $B'$ when the latter is open directly to the closet, and such flow will continue as long as desired until the valve $B'$ is allowed to close. The air in the upper portion of the tank A serves as a cushion to prevent any hammering, and as the supply enters the tank at a low point there is an entire absence of noise in this portion of the apparatus. The check-valve $D^5$ also aids in reducing or preventing objectionable noise by quickly opening and supplying air-pressure above the column of water left in the discharge-pipe below the valve $B'$ when the latter is closed, and thus allowing the water to flow rapidly and quietly to the closet without the noise due to displacement of the water by air entering from below.

Modifications may be made in the forms and proportions within wide limits without departing from the principle of the invention or sacrificing its advantages.

The passage leading to the air-valve may be outside the delivery-pipe $A^2$ and its connections. Fig. 5 shows an arrangement adapted for such construction. The pipe $E^{11}$ opens directly into the valve-casing B below the diaphragm and passing through the bottom of the tank leads to the air-valve, (not shown, but which may be in all respects similar to that in Figs. 2 and 3,) or the same pipe may be carried up outside the tank and connected to the air-valve through the side or top of the chamber $A'$. In either case the cup $D^3$ and the air-passages in the casing B may be omitted, the air required being drawn from the pipe $A^2$ at its open junction with the closet. The same effect may be produced by continuing the air-passage $D^2$ directly inward to the interior of the casing B.

The water-supply may enter the tank through an independent pipe tapped through the bottom or other low point. In such case the passages in the casting C may be dispensed with and a check-valve introduced at any convenient point in the pipe. Such construction will serve well, but necessitates an additional opening in the tank, to be avoided if possible. I prefer the construction and arrangement shown in Figs. 1 and 2.

I claim—

1. In an apparatus of the character herein described, an elevated closed tank, a chamber of relatively-small capacity located above said tank and forming part thereof, in combination with a discharge-pipe and a self-seating controlling-valve therein, a water-supply pipe entering said discharge-pipe above said valve, an air-supply valve located in said chamber and adapted to prevent the escape of water and permit air to enter when required, an air-supply pipe extending through said tank and discharge-pipe in communication with the external air and said air-valve, a stem for said valve with offset, a swinging weight engaged in said offset, and means for conveying any water leaking past the air-valve through said air-pipe to the said discharge-pipe below said controlling-valve, all substantially as herein specified.

2. The air-valve consisting of the casing E, the disk $E^2$ and its seat $E^9$, the stem $E^3$, the offset $E^6$ in the latter and the swinging weight $E^7$ inclosed by said offset and tending to seat the disk, in combination with a closed tank and connected water supply and discharge pipes, and an air-pipe leading to said valve within said tank, all substantially as herein specified.

3. The closed tank A, discharge-pipe $A^2$ therefrom, an air-valve located at the upper portion of said tank, a controlling-valve for said discharge-pipe consisting of the casing B and diaphragm $B^9$, disk $B'$, stem $B^2$ and spring $B^7$, in combination with the air-pipe $E'$ extending through said tank to said air-valve, and the air-passages D, $D'$ and $D^2$ within said controlling-valve casing connected to said air-pipe and by a trapped passage with the discharge-pipe, all substantially as herein specified.

4. The closed tank A, discharge-pipe $A^2$ therefrom, an air-valve located at the upper portion of said tank, a controlling-valve for said discharge-pipe consisting of the casing B and diaphragm $B^9$, disk $B'$, stem $B^2$ and spring $B^7$, in combination with the air-pipe $E'$ extending through said tank to said air-valve, and the air-passages D, $D'$ and $D^2$ within said controlling-valve casing, and the cup $D^3$, trap $D^6$ and passage $D^4$ formed in one with such casing, all substantially as and for the purposes herein specified.

5. The closed tank A, discharge-pipe $A^2$ therefrom, an air-valve located at the upper portion of said tank, a controlling-valve for said discharge-pipe consisting of the casing B and diaphragm $B^9$, disk $B'$, stem $B^2$ and spring $B^7$, in combination with the air-pipe $E'$ extending through said tank to said air-valve, the air-passages D, $D'$ and $D^2$ within said controlling-valve casing, a passage with trap between the passage $D^2$ and the discharge-pipe, and the water-supply pipe $C^4$, check-valve $C'$ and passage $C^2$ leading to said discharge-pipe above said diaphragm, all substantially as and for the purposes herein specified.

6. The closed tank A, discharge-pipe $A^2$ therefrom, an air-valve located at the upper portion of said tank, a controlling-valve for said discharge-pipe consisting of the casing B, diaphragm $B^9$, disk $B'$, stem $B^2$ and spring $B^7$, in combination with the air-pipe $E'$ extending through said tank to said air-valve, the air-passages D, $D'$ and $D^2$ within said controlling-valve casing connected to said air-pipe, the cup $D^3$ and trap $D^6$ leading to the interior of said casing below said diaphragm, a passage $D^4$ from said cup to said trap, and a check-valve $D^5$ located in the latter passage, all substantially as and for the purposes herein specified.

7. The closed tank A and chamber $A'$ forming the upper portion thereof, in combination with the air-valve located within said chamber and consisting of the casing E, disk $E^2$ and its seat $E^9$, the stem $E^3$ having the offset $E^6$, and swinging weight $E^7$ engaged in said offset, the discharge-pipe $A^2$ for said tank, and its controlling-valve consisting of the casing B, diaphragm $B^9$, disk $B'$, stem $B^2$ and spring $B^7$, and means for moving the stem in opposition to said spring, the air-passages D, $D'$ and $D^2$, cup $D^3$, check-valve $D^5$ and trap $D^6$ formed in the casing of said controlling-valve, and the air-pipe $E'$ leading from said air-passages to said air-valve, all substantially as and for the purposes herein specified.

8. In an apparatus of the character set forth, a passage leading from the service-pipe to the discharge-pipe, and a controlling-valve in such passage, in combination with an air-passage leading from the external air to the interior of said discharge-passage below said controlling-valve, and a check-valve located in said air-passage and performing the function of preventing the escape of water and allowing the free ingress of air, all substantially as and for the purposes herein specified.

In testimony that I claim the invention above set forth I affix my signature in presence of two witnesses.

ROBERT F. GILLIN.

Witnesses:
 HENDERSON B. HAYS,
 CHARLES R. SEARLE.